(12) United States Patent
Ahlgren et al.

(10) Patent No.: US 6,719,001 B2
(45) Date of Patent: *Apr. 13, 2004

(54) FLUID-DIRECTING MULTIPORT ROTARY VALVE

(75) Inventors: Brad Kevin Ahlgren, Apollo Beach, FL (US); Charles B. Snyder, Lakeland, FL (US); Ismail Fawaz, Wesley Chapel, FL (US)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/217,183

(22) Filed: Aug. 12, 2002

(65) Prior Publication Data

US 2003/0062084 A1 Apr. 3, 2003

Related U.S. Application Data

(63) Continuation of application No. 09/452,256, filed on Dec. 1, 1999, now Pat. No. 6,431,202.

(51) Int. Cl.[7] ............................................. F16K 11/074
(52) U.S. Cl. ............. 137/312; 137/601.05; 137/625.15; 137/625.17
(58) Field of Search .................... 137/312, 601.05, 137/625.15, 625.17, 601.06, 601.01

(56) References Cited

U.S. PATENT DOCUMENTS

| 4,764,276 A | * | 8/1988 | Berry et al. ................. 210/264 |
| 5,478,475 A | * | 12/1995 | Morita et al. .......... 137/625.15 |
| 6,431,202 B1 | * | 8/2002 | Ahlgren et al. ............. 137/312 |

* cited by examiner

*Primary Examiner*—Kevin Lee
(74) *Attorney, Agent, or Firm*—Cohen & Grigsby, P.C.

(57) ABSTRACT

A rotary valve for directing fluid streams which has a circular stationary head having at least one and desirably multiple primary ports for connection with fluid streams at least one secondary port. The stationary head includes a number of first circular concentric channels formed therein and at least one second concentric channel. The first and second channels are associated with the primary and secondary ports, respectively. A rotatable head is provided having radial chambers, each having a first and second port for connection between a first channel and a secondary port. The rotatable head rotates against the stationary head and channels in a fluid sealed manner. An indexable drive rotates the rotatable head to interconnect predetermined primary channels and secondary ports. The timing of rotation can be continuous or intermittent depending upon the associated process of the fluid streams.

9 Claims, 10 Drawing Sheets

FLUID-DIRECTING MULTIPORT ROTARY VALVE

CROSS-REFERENCE

The present application is a continuation of U.S. patent application Ser. No. 09/452,256 filed Dec. 1, 1999 now U.S. Pat. No. 6,431,202.

FIELD OF THE INVENTION

This invention relates to a multiport rotary valve for directing multiple fluid streams and, in particular to an improved rotary valve for simultaneously directing a plurality of fluid streams into and out of a fluid-solid contacting apparatus employed for separating a multi-component fluid mixture.

BACKGROUND OF THE INVENTION

Continuous fluid-solid contacting systems have been used to effect a separation of a multicomponent fluid mixture into its components by employing the different affinities of the solid towards individual components of the fluid mixture. Typically, the fluid mixture in such a separation is brought into contact with a bed of solid. As the fluid travels further downstream in the bed of solid, it is enriched in those components that are only weakly retained by the solid. On the other hand, the components that are strongly retained by the solid are recovered by introducing into the solid bed an eluent stream to free them from the solid. Generally, the effectiveness of the separation is increased when the fluid and solid phases move countercurrently to each other. However, an effective and easy-to-operate system in which the solid phase is truly moved countercurrently to the fluid phase has not been developed. Instead, simulated moving bed contacting apparatuses have been used in which a simulation of the movement of the solid phase is carried out. In such a system, the points at which the feed and eluent streams are introduced into the solid bed and the points at which the enriched product streams are taken from the solid bed are moved sequentially and intermittently in the direction of the fluid flow. As the number of points of fluid introduction increases, the operation approaches more closely the continuous countercurrent moving bed. At the same time, the piping system becomes more complex, and the number of valves increases exponentially, resulting in a high cost. Therefore, effort has been expended to design a multiport rotary valve to replace all the valves in a simulated moving bed wherein an external fluid is introduced to various points in the solid bed by the rotation of some elements in the rotary valve so that a certain port communicates with an appropriate point in the solid bed. For example, U.S. Pat. No. 4,569,371 issued to Dolejs et al. discloses a complicated unitary axial multipart rotary valve which comprises a three-section cylindrical hollow stationary body and a cylindrical rotating body which fits inside the stationary body. The connections through which feed, eluent, and products are conducted to and from the simulated moving bed are made to the stationary body. Various channels are formed inside the rotating body and terminate in the circumferential surface of this rotating body such that different connections may be rendered communicable by the rotation of this rotating body. In order to ensure a successful operation, the bodies must be manufactured to a very high degree of precision. Even then, numerous sophisticated seals must be provided between the stationary and rotating bodies to prevent intermixing of the various fluid streams. As the rotating body becomes eroded with use, it can be imagined that a significant effort must be expended to repair the valve because of its complexity. Thus, such a valve incurs high investment and maintenance costs.

U.S. Pat. No. 5,676,826 issued to Rossiter and Riley disclosed a fluid-solid contacting apparatus employing a rotary valve to conduct fluid streams to and from the apparatus. The fluid-solid contacting apparatus of this invention comprises a plurality of chambers containing a solid, which chambers are installed on a rotating carousel. The valve of this invention comprises an annular stationary head and an annular rotating head. Conduits are formed inside the stationary head and terminated in two sets of openings on two surfaces of the stationary head. External fluids are supplied to the fluid-solid apparatus and product streams from the apparatus are taken away through the first set of openings on the circumferential surface of the stationary head. Fluid conduits from the entrance and exit ends of each chamber communicate with still other sections of conduits precisely arranged in the rotating head. Through a synchronous rotation of the rotating head and the carousel, the conduits in this head are aligned to the second set of openings on the stationary head, resulting in the appropriate connections between external fluid conduits and selected chambers. The number of conduits formed in the rotating head is very large because each chamber is provided with two conduits: one to its entrance and one to its exit end. Therefore, in order to ensure a perfect alignment between certain of such a large number of conduits in the rotating head and the second set of openings in the stationary head, the manufacturing of such a valve requires a very high degree of precision, thus incurring a high cost. In addition, the operation of this rotary valve requires the synchronous rotation of both the rotating head of the valve and the carousel of the chambers. As the scale of the operation and, thus, the size of each of the chambers, increases the operation becomes expensive or even impractical.

Therefore, it is an object of the present invention to provide an improved rotary valve for simultaneously directing a plurality of fluid streams into and out of a fluid-solid contacting apparatus employed for separating a multicomponent fluid mixture, which valve does not have the disadvantages of the prior-art valves. It is a further object of the present invention to provide a rotary valve that has fewer moving parts and a simpler construction than prior-art rotary valves. Other advantages of the present invention will become apparent upon a perusal of the instant disclosure.

SUMMARY OF THE INVENTION

Generally, the present invention provides a multiport rotary valve which has a stationary circular head which has at least one primary port for connection with a fluid stream and at least one secondary port. In practice, it is preferred to have a number of primary and secondary ports for connection with fluid separation equipment, for example.

The stationary head, which can comprises number of ports formed as a component assemble, includes one circular channel formed therein which is associated with a primary port and at least one second concentric circular channel associated with a secondary port or ports.

A rotatable head is provided having at least one radial chamber, the radial chamber includes first and second ports for connection with one of at least one first channels and one of the second ports.

The valve includes an indexable drive for rotating the rotatable head between pre-selected primary and secondary ports.

In an example of the invention, optionally, a sensor is used to control the position of the rotatable head relative to the first head.

In a presently preferred embodiment, a rotary valve is provided having multiple ports for connection with a plurality of external fluid-carrying conduits to direct fluid streams contained in these conduits, according to a predetermined cycle, into and out of a fluid-solid contacting apparatus comprising a plurality of separation zones for a separation of a multicomponent fluid mixture. The rotary valve permits the connection of a fluid-carrying conduit to at most one other fluid-carrying conduit and prevents intermixing of fluids contained in the different fluid-carrying conduits while such fluids are flowing through the apparatus. After a predetermined time, one of any two interconnected fluid-carrying conduits is replaced by a different fluid-carrying conduit through a movement of an element of the rotary valve so that fluid is directed to or from a different position within the fluid-solid contacting apparatus. In the same manner, the rotary valve advances sequentially through its different positions or indices in accordance with the previously determined cycle.

A preferred embodiment of the rotary valve comprises a plurality of cooperative assemblies: a circular rotatable head having first and second opposed surfaces, and at least one stationary head assembly having first and second opposed surfaces. The rotatable and stationary head assemblies have circular shapes of substantially equal diameters. The rotatable head is disposed adjacently to one stationary surface of a stationary head assembly such that the centers of the assemblies substantially coincide, and rotates about an axis of rotation that runs perpendicularly to the circular surfaces of the assemblies and through their substantially coincident centers. The rotatable head assembly is urged against a stationary head assembly by a force that is supplied to the surface of the rotatable head opposite to a stationary head assembly.

A plurality of concentric circular channels is formed in the second stationary surface adjacent to the rotatable head. A plurality of primary connections is provided on the surface of a stationary head assembly opposite to the rotatable head assembly, through which primary connections fluid is conducted to or from the overall fluid-solid contacting apparatus. Each primary connection communicates with a cylindrical primary bore that runs through the thickness of the stationary head assembly on which these primary connections are disposed and terminates in one of the concentric circular channels of the same stationary head assembly. A plurality of secondary connections is uniformly spaced apart on a circle concentric with the circular channels and attached to the same or another stationary head assembly, and forms an array of connections to intermediate points representing the end of one and the beginning of another separation zone within the fluid-solid contacting apparatus. Each secondary connection communicates with a separate cylindrical secondary bore that runs through the thickness of the stationary head on which it is attached and that is in alignment with said secondary connection. The number of secondary connections is equal to the number of separation zones of the fluid-solid contacting apparatus so that each separation zone is connected to one secondary connection at an appropriate time.

A plurality of radial chambers are formed within the thickness of the rotating head assembly so to allow for the communication between the primary connections and each of the secondary connections. The number of radial chambers are equal to the number of concentric circular channels. Each radial chamber connects the cylindrical secondary bore that is in communication with a selected secondary connection to a cylindrical primary bore that is in communication with one of the primary connections through one of the circular channels, thereby allowing fluid present at a primary connection to be conducted to a separation zone or allowing fluid from another separation zone to be conducted to another primary connection. At a predetermined time, the rotating head assembly rotates and advances to the next position or index so that fluid is conducted to and from the next separation zones in the sequence. In this manner, each separation zone performs the separation of the fluid components for a defined time and is subsequently treated by an eluent so that the separation capability of the solid is recovered for further separation use for the same defined time.

The solid is often said to have been regenerated when its separation capability has been recovered to such a degree that it becomes useable to effect the separation when it is contacted again with the multicomponent fluid mixture. The rotation of the rotating head assembly can also be initiated when the concentration of a component of the fluid mixture coming from a separation zone reaches a predetermined level. The separation of the components of the fluid mixture is carried out continuously and indefinitely through the rotation of the rotating head assembly. Other advantages of the invention will become apparent from a perusal of the following detailed description of the presently preferred embodiment taken in connection with the accompanying drawings.

DETAILED DESCRIPTION OF THE INVENTION

A presently preferred embodiment of the multiport rotary valve of the present invention is showed and described in conjunction with a fluid-solid contacting apparatus wherein a multicomponent fluid mixture is separated into its components by the different affinities of the components of the fluid mixture towards the solid. In this embodiment, the components of the fluid mixture are retained in the solid more or less strongly depending on their affinities towards the solid. The less strongly retained components are carried in the fluid stream and concentrated at a point downstream from the point at which the feed fluid mixture is introduced into the bed of solid. The term "raffinate" or "raffinate stream" is used herein to denote the stream containing the less strongly retained components. The more strongly retained components are concentrated on the solid and recovered by an eluent that reversibly frees them from the solid. The term "extract" or "extract stream" is used herein to denote the fluid stream containing the strongly retained components. In order for the separation process to be carried out continuously, the points at which the feed fluid mixture and the eluent are introduced into the bed of solid and those at which the raffinate and the extract are taken from the bed of solid must be moved periodically along the bed in the direction of the fluid flow. Thus, the solid may be viewed as being moved countercurrently to the fluid in a simulated fashion.

Figure 1:
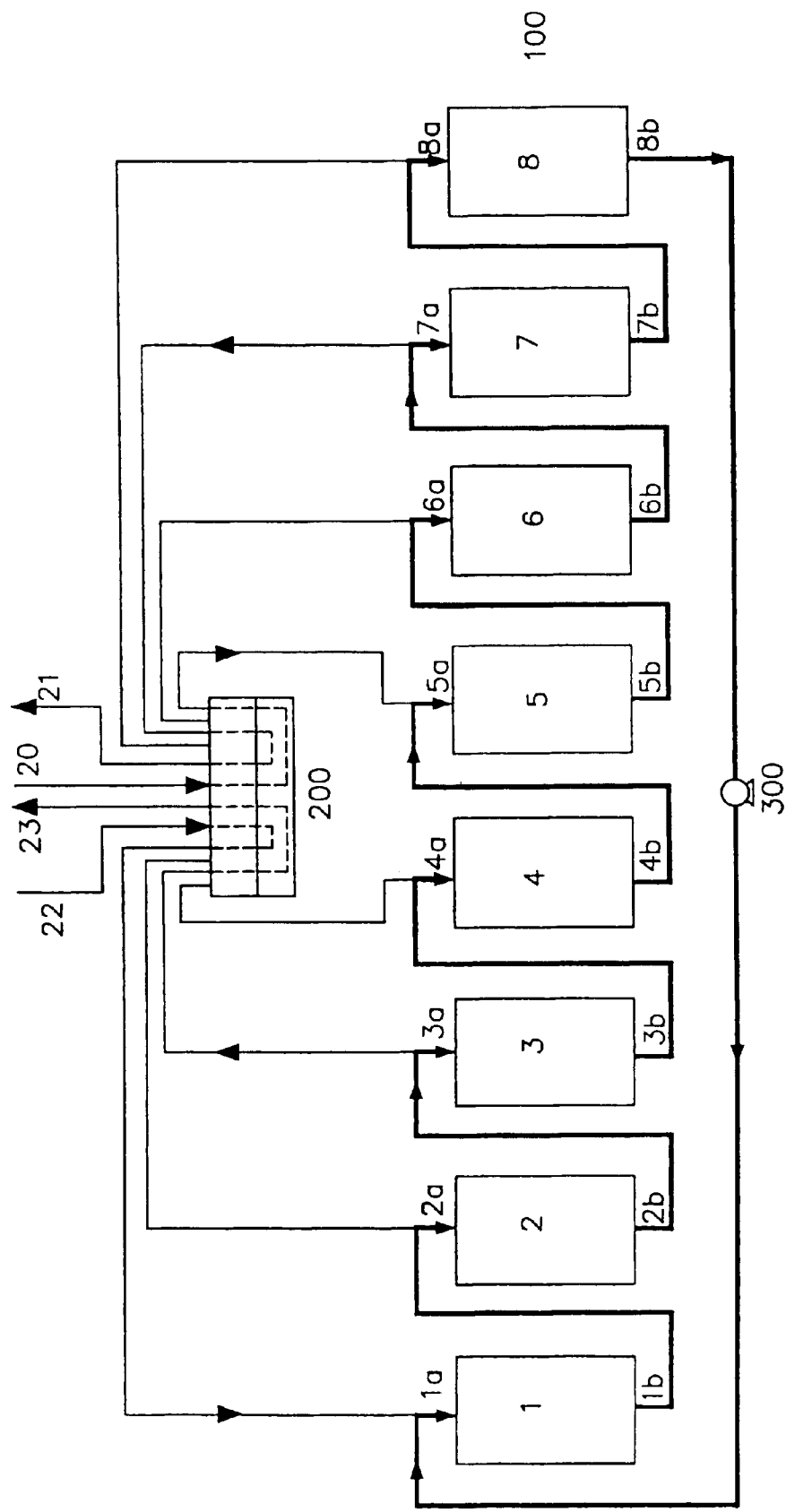
FIG. 1 is a schematic diagram of a multizone fluid-solid contacting apparatus for the separation of a multicomponent fluid mixture.

Referring to FIG. 1, the simulated moving bed of solid 100 that is used in conjunction with the fluid-directing rotary valve of the present invention comprises a plurality of unit packed beds 1 through 8 connected in series to each other. The number of unit packed beds in this figure serves only to illustrate the operation of the present invention, but any number of beds greater than or equal to four may be used. The exit end of one unit packed bed is connected to the entrance end of the next downstream unit packed bed to form an endless circulation loop. Each unit packed bed acts as a separation zone in which the fluid mixture is enriched in the less strongly retained components as the fluid mixture flows towards the exit end of the packed bed. At the same time, the more strongly retained components of the fluid mixture are progressively removed from the fluid and retained in the solid. Alternatively, the separation zones may be contained in a single vessel but separated from each other by any suitable separating means such as a screen or a fluid distributing means that can effect a substantially uniform distribution of the fluid over the cross section of the zone. In the latter configuration, the solid is contained in the vessel and the fluid distributing means serve as the demarcation lines between two adjacent separation zones. The feed fluid stream 20 is introduced into the simulated moving bed 100 through the rotary valve 200 of the present invention and through fluid conduit 5a leading to the entrance end of unit packed bed 5. The raffinate stream 21 is taken from the simulated moving bed I 00 through the rotary valve 200 via fluid conduit 6b leading from the exit end of unit packed bed 6. The eluent stream 22 is introduced into the simulated moving bed 100 through the rotary valve 200 and through fluid conduit I a leading to the entrance end of unit packed bed 1. The extract stream 23 is taken from the simulated moving bed I 00 through the rotary valve 200 via fluid conduit 2b leading from the exit end of unit packed bed 2. Fluid moving means 300, such as a pump, provides a continuous recirculation of fluid through the series of unit packed beds.

Figure 2:
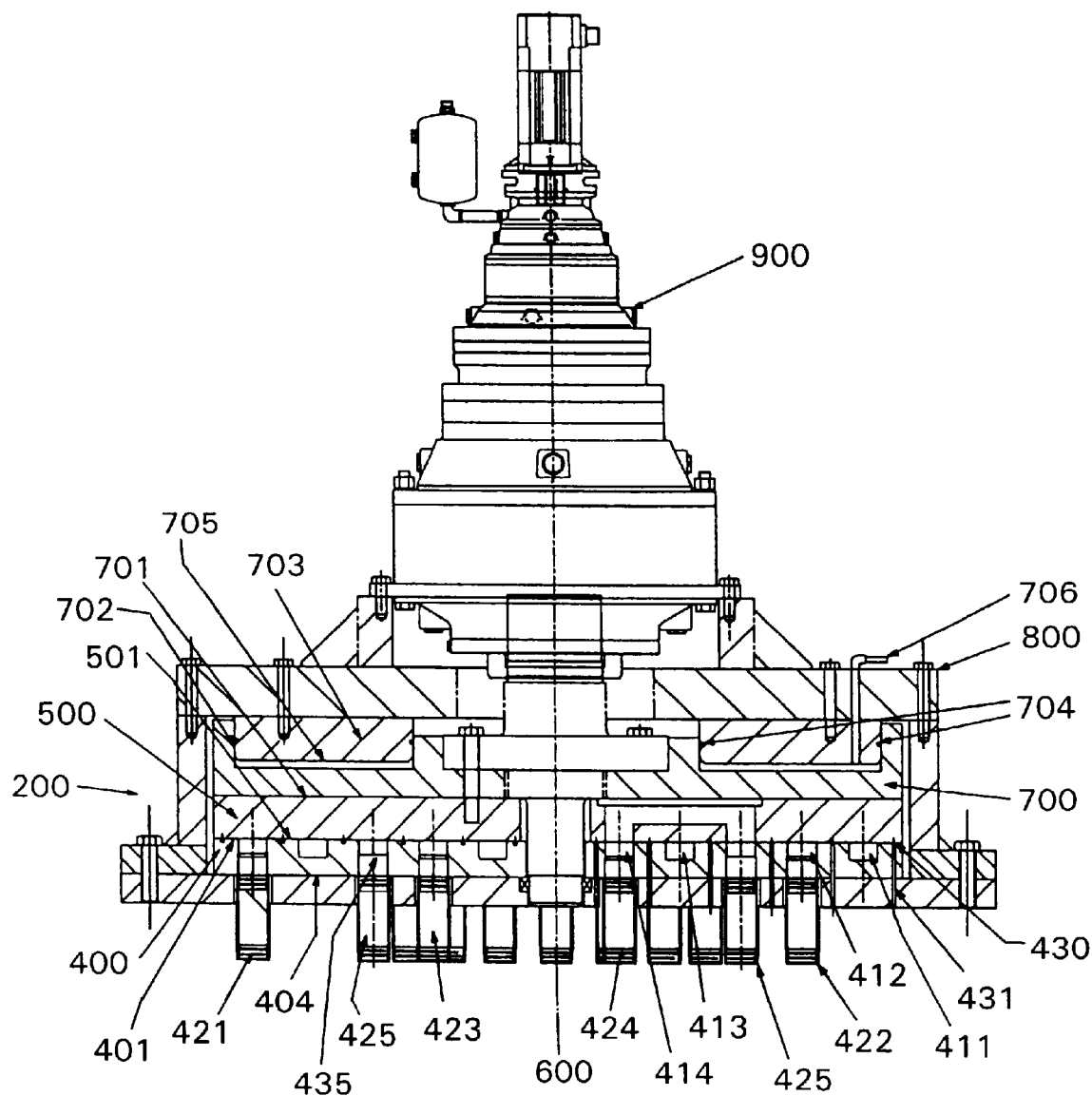
FIG. 2 is a sectional elevation of the first embodiment of the rotary valve of the present invention using a piston as the force-applying means.
Figure 3:
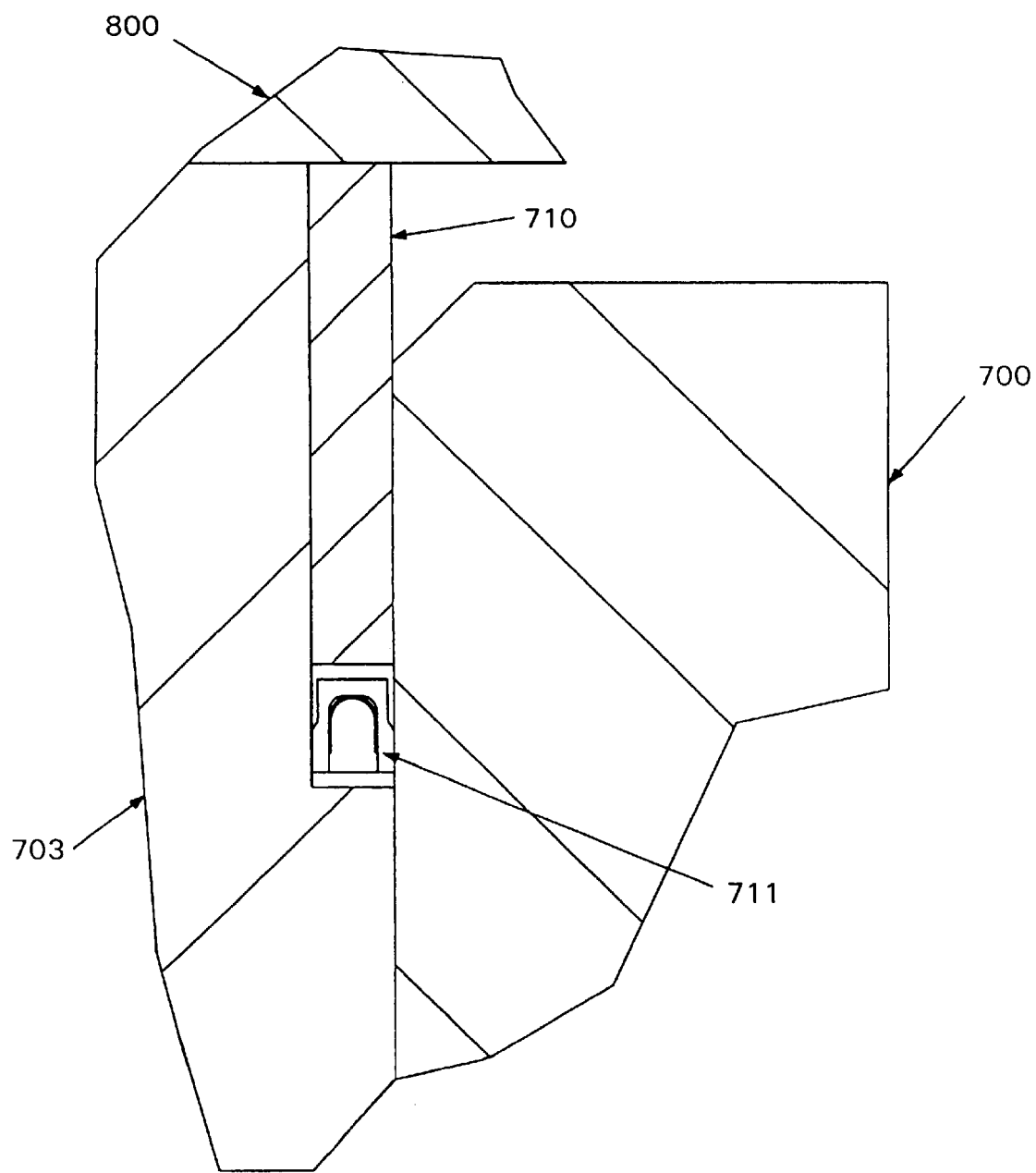
FIG. 3 is an enlarged section of the sealing mechanism between the piston and the piston housing.
Figure 4:
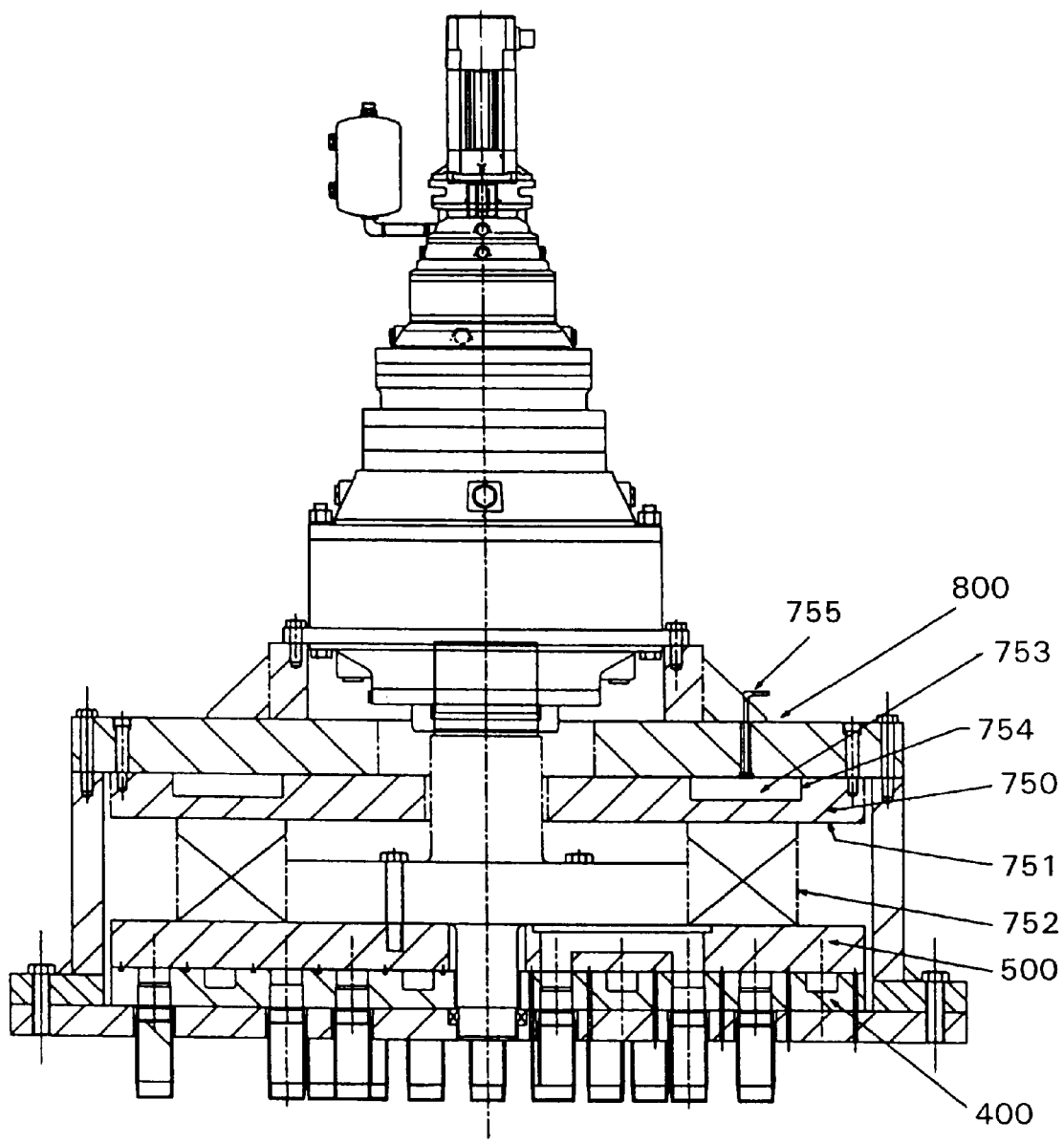
FIG. 4 is a sectional elevation of the first embodiment of the rotary valve of the present invention using a pressurized bladder as the force-applying means.

FIG. 2 shows a sectional elevation of the rotary valve of the present invention. The rotary valve 200 comprises two major assemblies: a stationary head assembly 400 and a rotatable head 500; both are of circular shape having substantially equal diameter and each having opposed surfaces. The stationary surface 401 of the stationary head assembly 400 is disposed adjacently to the rotating surface 501 of the rotating head 500. The stationary head is preferably made of a polymeric material that is strongly resistant to abrasion and chemically compatible with the components of the fluid mixture; such polymeric material may be selected from the group consisting of high density polyethylene, ultrahigh density polyethylene, polypropylene, polytetrafluoroethylene (PTFE), fluorinated ethylene propylene (FEP), perfluoroalkoxyalkane (PFA), ethylene tetrafluoroethylene (ETFE), ethylene chlorotrifluoroethylene (ECTFE), polychlorotrifluoroethylene (PCTFE), polyvinyl chloride (PVC), polyvinylidenefluoride (PVDF), polyetheretherketone (PEEK, and derivatives thereof The stationary head assembly may also be made of a machinable metal that is compatible with the components of the fluid mixture to be separated and may be selected from the group consisting of brass; bronze; carbon steels; stainless steels; monel; nickel; titanium; zirconium; alloys of nickel, chromium, and iron; and alloys of nickel, iron, and molybdenum. The stationary head assembly may be optionally made of two plates attached or fastened together, one slightly larger than the other so that there are provided points; for example, around the circumference of the larger plate; for attachment of the valve assembly to a fixed support. The rotating head assembly is preferably made of a machinable metal that is compatible with the components of the fluid mixture to be separated and may be selected from the group consisting of brass; bronze; carbon steels; stainless steels; monel; nickel; titanium; zirconium; alloys of nickel, chromium, and iron; and alloys of nickel, iron, and molybdenum. The rotating head assembly may also be made of a polymeric material that is strongly resistant to abrasion an chemically compatible with the components of the fluid mixture; such polymeric material may be selected from the group consisting of high density polyethylene, ultrahigh density polyethylene, polypropylene, polytetrafluoroethylene (PTFE), fluorinated ethylene propylene (FEP), perfluoroalkoxyalkane (PFA), ethylene tetrafluoroethylene (ETFE), ethylene chlorotrifluoroethylene (ECTFE), polychlorotrifluoroethylene (PCTFE), polyvinylchloride (PVC), polyvinylidenefluoride (PVDF), polyetheretherketone (PEEK), and derivatives thereof. The rotating head assembly is disposed adjacently to the stationary head assembly such that its rotating surface 501 is cooperatively matched with the stationary surface 401 of the stationary head assembly and the centers of the assemblies substantially coincide, and rotates about the axis of rotation 600 that runs perpendicularly to the circular surfaces of the assemblies and through their substantially coincident centers. A piston housing 700 having a circular shape and at least one flat surface 701 is disposed on the rotating head assembly opposite to the stationary head assembly such that the flat surface 701 of the piston housing is adjacent to the rotating head assembly. An annular cylindrical depression 702 is formed into the piston housing and away from the rotating head assembly 500. The piston housing 700 is fastened to the rotating head assembly 500 so that both rotate at the same time. An annular piston 703 fits inside the annular cylindrical depression 702 and is sealed against the piston housing 700 by a sealing means 704 such as a metal ring, an O-ring made of a polymeric material, or other compressible circular articles capable of providing a tight seal between the cylindrical surfaces of the piston and the piston housing. FIG. 3 shows an example of such a seal comprising a metal or plastic wear ring 710 in combination with a compressible ring 711 made of a polymeric material. The piston 703 does not completely traverse the depth of the annular cylindrical depression 702 so to leave a space 705 between them. A compressed gas or hydraulic fluid is supplied into the space 705 through connection 706 so that a force is applied on the rotating head assembly 500 by which force the rotating head assembly 500 is urged against the stationary head assembly 400 to provide a sealing action between the rotating head assembly 500 and the stationary head assembly 400. A stationary support plate 800 is disposed adjacently to and fastened to the piston 703. The stationary support plate 800 is also fastened to the stationary head assembly to provide stability to the whole valve assembly. Other means for applying a force on the rotating head assembly may be used to perform the same function, in a substantially similar manner, and to achieve a substantially similar result. For example, in place of the piston, a pressurized bladder may be provided to achieve the same objective. FIG. 4 shows this alternative embodiment of the invention. A stationary bladder housing 750 having a circular shape and at least one flat surface 751 is disposed near the rotating head assembly 500 and opposite to the stationary head assembly 400. Thrust bearings 752 are disposed between the rotating head assembly 500 and the bladder housing assembly 750 to provide a substantial stability to the rotating head assembly as it rotates. The bladder housing 750 contains at least one annularly shaped bladder 753 that resides in an annular channel 754 that is formed into the bladder housing 750. A compressed gas or hydraulic fluid is supplied into the bladder 753 through connection 755 so that a force is applied on the thrust bearings 752 and the rotating head assembly 500 by which force the rotating head assembly 500 is urged against the stationary head assembly 400. A stationary support plate 800 is disposed adjacently to and fastened to the bladder housing 750. The stationary support plate-800 is also fastened to the stationary head assembly 400 to provide stability to the whole valve assembly. Still other embodiments of force-applying means are possible. For example, the combination of the piston housing 700 and the piston 703 may be replaced by a solid plate which is disposed between the rotating head assembly 700 and the stationary support plate 800 and fastened to the stationary support plate 800. A plurality of tightening fasteners are provided through the support plate 800 to apply a force on the rotating head assembly 500. These tightening fasteners are adjusted from time to time to keep a substantially constant force on the rotating head assembly 500.

A plurality of concentric circular channels such as 411, 412, 413, and 414 are formed into the stationary surface 401 of the stationary head. Thus, a fluid coming into a circular channel at any point in a circular channel becomes available everywhere in this channel. The number of the concentric circular channels is equal to the number of streams of fluid that are to be conducted to and from outside the fluid-solid contacting apparatus. Thus, in the typical separation in which two input streams (one feed fluid mixture and one eluent) are conducted to and two output streams (one raffinate and one extract) are conducted away from the fluid-solid contacting apparatus, four concentric circular channels are required. In other situations where more than two products, more than one feed, or more than one eluent is required, the number of concentric channels will be more than four, but is always equal to the sum of the numbers of input and output streams. In order to prevent leakage of fluid between two adjacent circular channels or leakage of fluid from the valve, there is provided a circular draining groove 430 between two adjacent channels or near the edges of the stationary head assembly. A drain hole 431 is provided from each draining groove through the thickness of the stationary head assembly in order to carry away any fluid leaking into the draining groove. In addition, leakage of fluid may be further prevented by expandable circular seals disposed on stationary surface 401 of the stationary head assembly 400 on either side of each draining groove 430. Each of such expandable circular seals comprises a spring disposed inside a housing made of a polymeric material and is located in a circular sealing groove formed on surface 401. The opposing actions of the spring and the force-applying means eliminates any leakage of fluid due to any unexpected gap that may exist between the rotating head assembly and the stationary head assembly.

Figure 5:
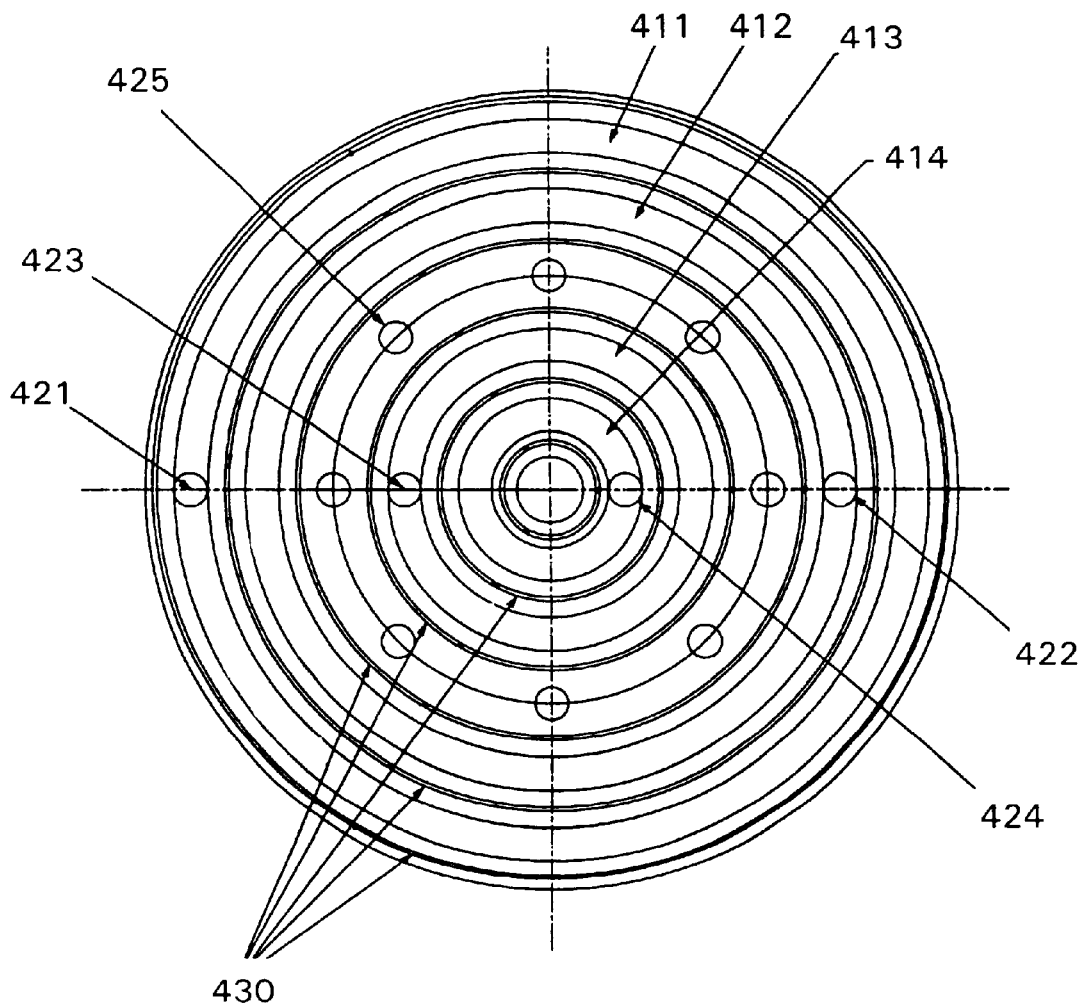
FIG. 5 is a top plan of the stationary head assembly of the first embodiment of the rotary valve of the present invention.
Figure 6:
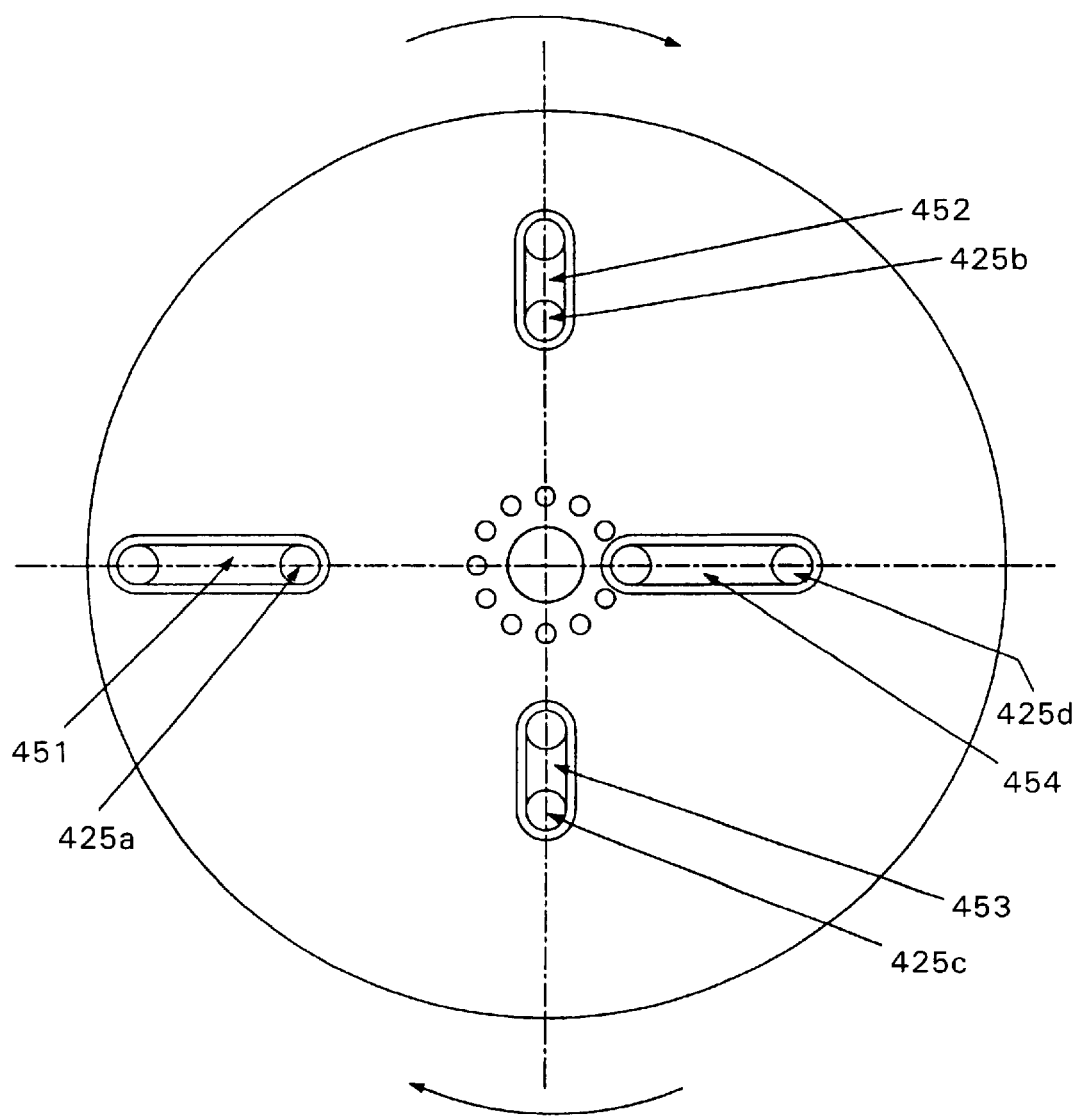
FIG. 6 is the top plan of the rotatable head of the first embodiment of the rotary valve of the present invention.

A plurality of primary connections such as 421, 422, 423, and 424 is provided through the stationary surface 404 of the stationary head assembly opposite to the rotating head assembly, through which connections fluid is conducted to or from outside the fluid-solid contacting apparatus. Thus, the number primary connections is equal to the sum of the numbers of input fluid streams conducted to and of output fluid streams away from the fluid-solid contacting apparatus and may be greater than four. Each of these primary connections communicates with a cylindrical primary bore that runs through the thickness of the stationary head and terminates in one of the concentric circular channels. An array of secondary connections 425 is uniformly spaced-apart and arranged on a circle concentric with the channels and through the stationary surface 404 of the stationary head assembly. The entrance end of each unit packed bed communicates with one such secondary connection via a separate fluid conduit. Thus, the number of secondary connections is equal to the number of unit packed beds. Each secondary connection 425 communicates with a cylindrical secondary bore 435 that runs through the thickness of the stationary head and terminates in an opening on stationary surface 401. FIG. 5 shows the top view of the stationary head assembly with the hidden locations of the primary connections 421, 422, 423, and 424 and the secondary connections 425. FIG. 5 also shows the concentric channels 411, 412, 413, and 414; each of which is in communication with a primary connection 421, 422, 423, or 424. While the present preferred embodiment shows that the array of secondary connections 425 is arranged on a circle having an intermediate diameter, this circle may have a diameter greater than that of the greatest circular channel or smaller than that of the smallest circular channel, and the operation of the instant invention will not be affected. Primary connection 421 serves, for example, to transport the raffinate stream away from the moving-bed fluid-solid contacting apparatus. Primary connection 422 serves, for example, as the point of introduction of the eluent fluid into the fluid-solid contacting apparatus. Primary connection 423 serves, for example, as the point of introduction of the feedstock fluid into the fluid-solid contacting apparatus. Primary connection 424 serves, for example, to transport the extract away from the fluid-solid contacting apparatus. FIG. 6 shows the top view of the rotating head assembly of the first embodiment of the rotary valve of the present invention. A plurality of U-shaped caverns is cut into the rotating head assembly. The number of such U-shaped caverns is equal to the number of primary connections or the number of concentric channels. In this Figure, four such U-shaped caverns are shown representatively and are hidden from the top view. It is understood that more than four U-shaped caverns may be provided when the total number of fluid streams conducted to and away from the fluid-solid contacting apparatus is greater than four. Each U-shaped cavern provides a means to communicate between one of the concentric channels in the stationary head assembly and a distinct secondary connection in the same so that fluid present in a concentric channel is available to a different unit packed bed through the secondary connection, and vice versa. U-shaped cavern 451 connects the outermost circular channel 411 to a first secondary connection 425a. Through this cavern, circular channel 411, and secondary connection 425a; the raffinate stream from the unit packed bed connected with the secondary connection 425a is taken away from the fluid-solid contacting apparatus. U-shaped cavern 452 connects circular channel 412 to a second secondary connection 425b. Through this cavern, circular channel 412, and primary connection 422; the eluent fluid is introduced into a second unit packed bed. U-shaped cavern 453 connects circular channel 413 to a third secondary connection 425c. Through this cavern, circular channel 413, and primary connection 423; the feedstock fluid stream is introduced into the fluid-solid contacting apparatus. U-shaped cavern 454 connects circular channel 414 to a fourth secondary connection 425d. Through this cavern, circular channel 414, and primary connection 424; the extract stream is conducted away from the fluid-solid contacting apparatus. The relative positions of the secondary connections 425a, 425b, 425c, and 425d depend on the particular separation for which the moving-bed fluid-solid contacting apparatus is used. For example, factors that influence the number of unit packed beds in series between the locations of any two of the secondary connections 425a, 425b, 425c, and 425d include, but are not limited to, the type of solid packing, the affinity of the solid towards each component of the fluid mixture, the flow rate of the fluid mixture through the beds, the temperature of the fluid mixture, and the type of eluent. The function of the rotary valve of the present invention is now further described in connection with the simulated moving-bed fluid-solid contacting apparatus of FIG. 1. A multicomponent feedstock fluid mixture comprising at least one component that is relatively weakly retained on the solid packing of the unit packed beds and at least one other component that is relatively strongly retained on the same solid is fed into the simulated moving-bed fluid-solid contacting apparatus via primary connection 423, circular channel 413, U-shaped cavern 453, and secondary connection 425c. In FIG. 1; for example, outer connection 425c is connected to the entrance of the unit packed bed 5 via a fluid conduit 5a. The fluid mixture flows through the series of unit packed beds 5 and 6 without traversing the rotary valve. As the fluid mixture flows through the unit packed beds, it is enriched in the components that are less strongly retained on the solid. This enriched stream is available in conduit 6b connecting the exit end of unit packed bed 6 and the entrance end of unit packed bed 7. Part of this stream is taken out of the fluid-solid contacting apparatus as the raffinate stream via the rotary valve. This stream flows from conduit 6b to outer connection 425a, through cavern 451, to circular channel 411, and out of the apparatus via primary connection 421. An eluent stream is fed into the fluid-solid contacting apparatus at some unit packed bed downstream to free the more strongly retained components of the fluid mixture from the solid. For example, in FIG. 1, the eluent is fed into the entrance of unit packed bed 1 via fluid conduit 1a. The eluent from outside the apparatus is fed into primary connection 422 on the stationary head of the rotary valve, into circular channel 412, cavern 452, secondary connection 425b, and to the entrance end of unit packed bed I via fluid conduit 1a. As the eluent flows through a series of unit packed beds, it becomes enriched with the more strongly retained components of the fluid mixture. A part of this stream is taken out of the fluid-solid contacting apparatus as the extract stream at a point downstream from the point of introduction of the eluent. For example, in FIG. 1, the eluent flows through unit packed beds 1 and 2 in series. The extract stream is taken from fluid conduit 2b to secondary connection 425d on the stationary head of the rotary valve, through cavern 454, into circular channel 414, and out of the fluid-solid contacting apparatus via primary connection 424. After a predetermined time, or when the concentration of a component in the raffinate or extract stream reaches a predetermined level, the rotating head rotates to the next position or index in the direction of the arrows in FIG. 4 so that each of the U-shaped caverns 451, 452, 453, and 454 communicates with the next unit packed bed in the series, respectively. In this way, the separation is carried out continuously and endlessly.

The rotating head assembly 500 of the rotary valve 200 of the present invention is driven by any suitable driving means 900, such as a combination of motor and gears or timing belts, a combination of pneumatic reciprocating piston and ratchet arms, or other devices that can impart a rotation on the rotating head assembly. Finally, the stationary head, the rotating head, the pressure plate assemblies, and the force-applying means are assembled together and attached to a fixed support.

Figure 7:
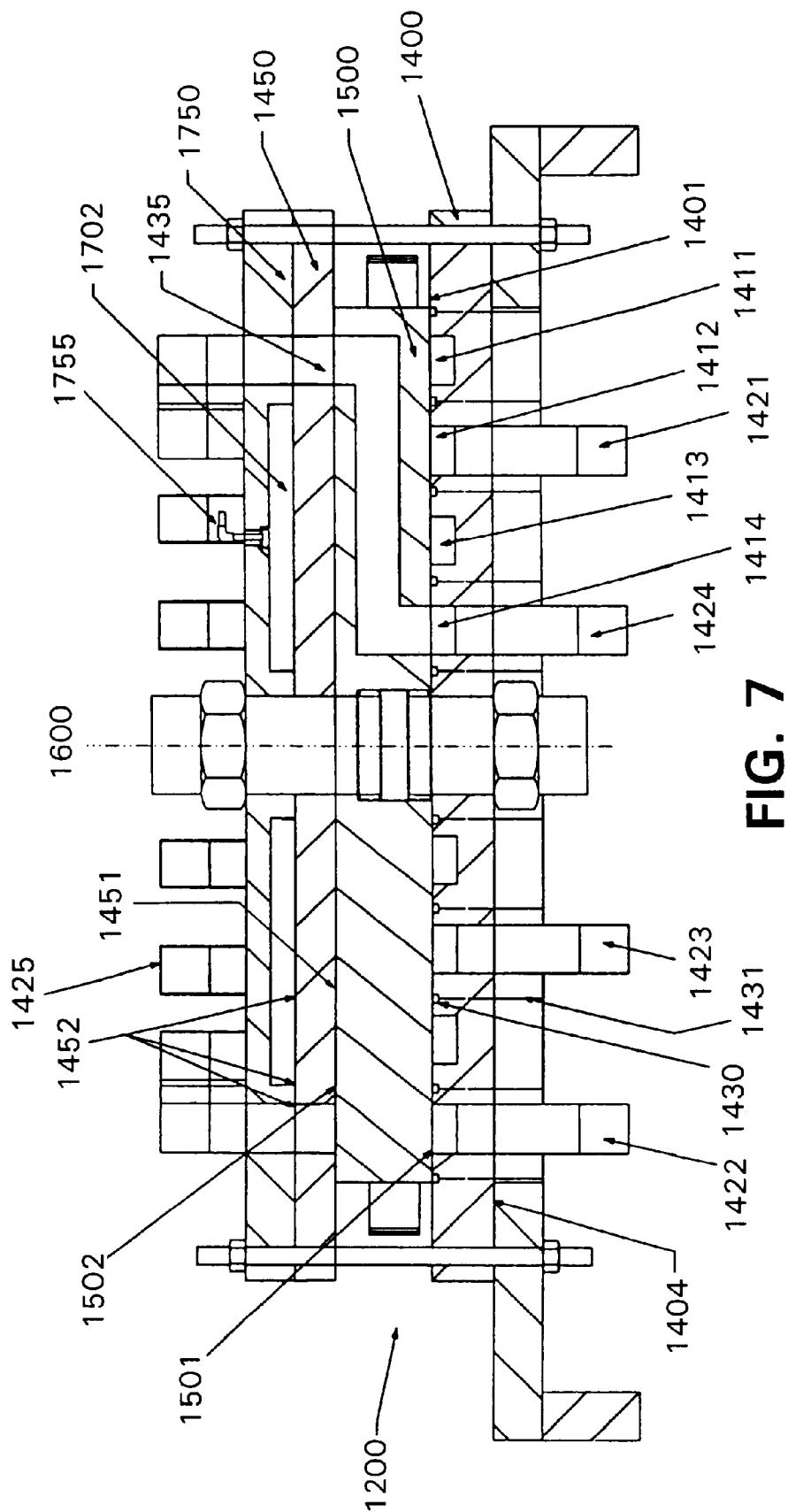
FIG. 7 is a sectional elevation of the second preferred embodiment of the rotary valve of the present invention including two stationary head assemblies and one rotating head assembly.

FIG. 7 shows the cut-away view of a second preferred embodiment of the present invention. The rotary valve 1200 comprises three major assemblies: a first stationary head assembly 1400, a second stationary head assembly 1450, and a rotating head assembly 1500; all are of circular shape. Each of the stationary head assembly has two opposed stationary surfaces. The rotating head assembly has two opposed rotating surfaces. The stationary head assemblies are preferably made of a polymeric material that is strongly resistant to abrasion and chemically compatible with the components of the fluid mixture; such polymeric material may be selected from the group consisting of high density polyethylene, ultrahigh density polyethylene, polypropylene, polytetrafluoroethylene (PTFE), fluorinated ethylene propylene (FEP), perfluoroalkoxyalkane (PFA), ethylene tetrafluoroethylene (ETFE), ethylene chlorotrifluoroethylene (ECTFE), polychlorotrifluoroethylene (PCTFE), polyvinylchloride (PVC), polyvinylidenefluoride (PVDF), polyetheretherketone (PEEK), and derivatives thereof. The stationary head assemblies may also be made of a machinable metal that is compatible with the components of the fluid mixture to be separated and may be selected from the group consisting of brass; bronze; carbon steels; stainless steels; monel; nickel; titanium; zirconium; alloys of nickel, chromium, and iron; and alloys of nickel, iron, and molybdenum. The first stationary head assembly may be optionally made of two plates attached or fastened together, one slightly larger than the other so that there are provided points; for example, around the circumference of the larger plate; for attachment of the valve assembly to a fixed support. The rotating head assembly is preferably made of a machinable metal that is compatible with the components of the fluid mixture to be separated and may be selected from the group consisting of brass; bronze; carbon steels; stainless steels; monel; nickel; titanium; zirconium; alloys of nickel, chromium, and iron; and alloys of nickel, iron, and molybdenum. The rotating head assembly may also be made of a polymeric material that is strongly resistant to abrasion and chemically compatible with the components of the fluid mixture; such polymeric material may be selected from the group consisting of high density polyethylene, ultrahigh density polyethylene, polypropylene, polytetrafluoroethylene (PTFE), fluorinated ethylene propylene (FEP), perfluoroalkoxyalkane (PFA), ethylene trifluoroethylene (ETFE), ethylene chlorotrifluoroethylene (ECTFE), polychlorotrifluoroethylene (PCTFE), polyvinylchloride (PVC), polyvinylidenefluoride (PVDF), polyetheretherketone (PEEK), and derivatives thereof. The rotating head assembly is disposed between the first and second stationary head assemblies such that its first circular rotating surface 1501 is cooperatively matched with the circular stationary surface 1401 of the first stationary head assembly, and its second circular rotating surface 1502 is cooperatively matched with the circular stationary surface 1451 of the second stationary head assembly, and such that the centers of the assemblies substantially coincide, and rotates about the axis of rotation 1600 that runs perpendicularly to the circular surfaces of the assemblies and through their substantially coincident centers. A space or spaces 1702 are formed inside the bladder housing 1750, and one or more pressurized bladders may be provided in the space or spaces 1702. A compressed gas or hydraulic fluid is supplied into each bladder through connection 1755 so that a force is applied on the second stationary head assembly 1450 and the rotating head assembly 1500 by which force both the second stationary head assembly 1450 and the rotating head assembly 1500 are urged against the first stationary head assembly 1400. The second stationary head assembly 1450 is fastened to the first stationary head assembly 1400 to provide stability to the whole valve assembly. Other embodiments of force-applying means as are described earlier in the present disclosure are possible.

A plurality of concentric circular channels such as 1411, 1412, 1413, and 1414 are formed into the stationary surface 1401 of the stationary head. Thus, a fluid coming into a circular channel at any point in a circular channel becomes available everywhere in this channel. The number of the concentric circular channels is equal to the number of streams of fluid that are to be conducted to and from outside the fluid-solid contacting apparatus. Thus, in the typical separation in which two input streams (one feed fluid mixture and one eluent) are conducted to and two output streams (one raffinate and one extract) are conducted away from the fluid-solid contacting apparatus, four concentric circular channels are required. In other situations where more than two products, more than one feed, or more than one eluent is required, the number of concentric channels will be more than four, but is always equal to the sum of the numbers of input and output streams. In order to prevent leakage of fluid between two adjacent circular channels or leakage of fluid from the valve, there is provided a circular draining groove 1430 between two adjacent channels or near the edges of the stationary head assembly. A drain hole 1431 is provided from each draining groove through the thickness of the stationary head assembly in order to carry away any fluid leaking into the draining groove. In addition, leakage of fluid may be further prevented by expandable circular seals disposed on surface 1401 of the first stationary head assembly 1400 on either side of each draining groove 1430. Each of such expandable circular seals comprises a spring disposed inside a housing made of a polymeric material and is located in a circular sealing groove formed on stationary surface 1401. The opposing actions of the spring and the force-applying means eliminates any leakage of fluid due to any unexpected gap that may exist between the rotating head assembly and the first stationary head assembly.

Figure 8:
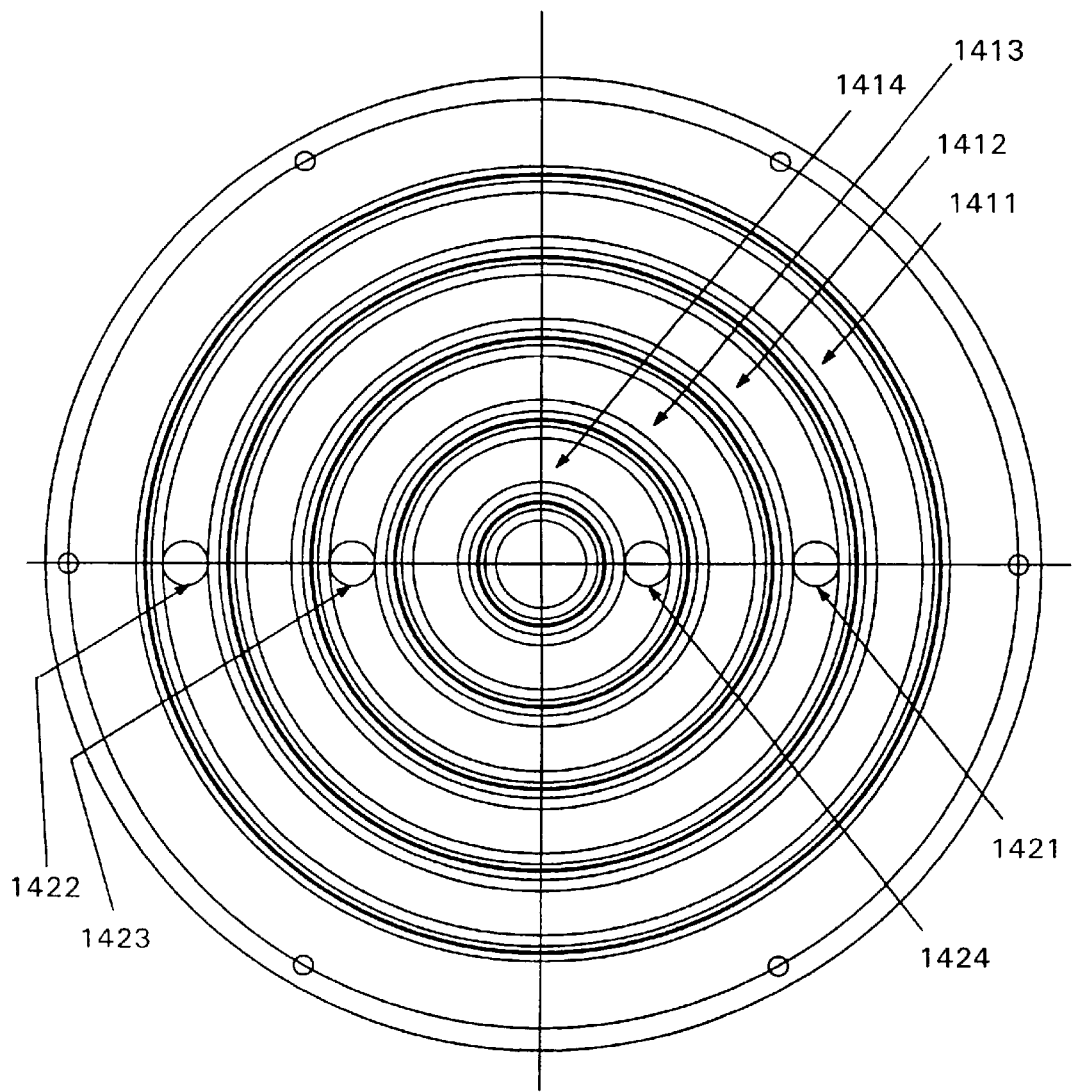
FIG. 8 is a top plan of the first stationary head assembly of the second preferred embodiment of the rotatable valve of the present invention.
Figure 9:
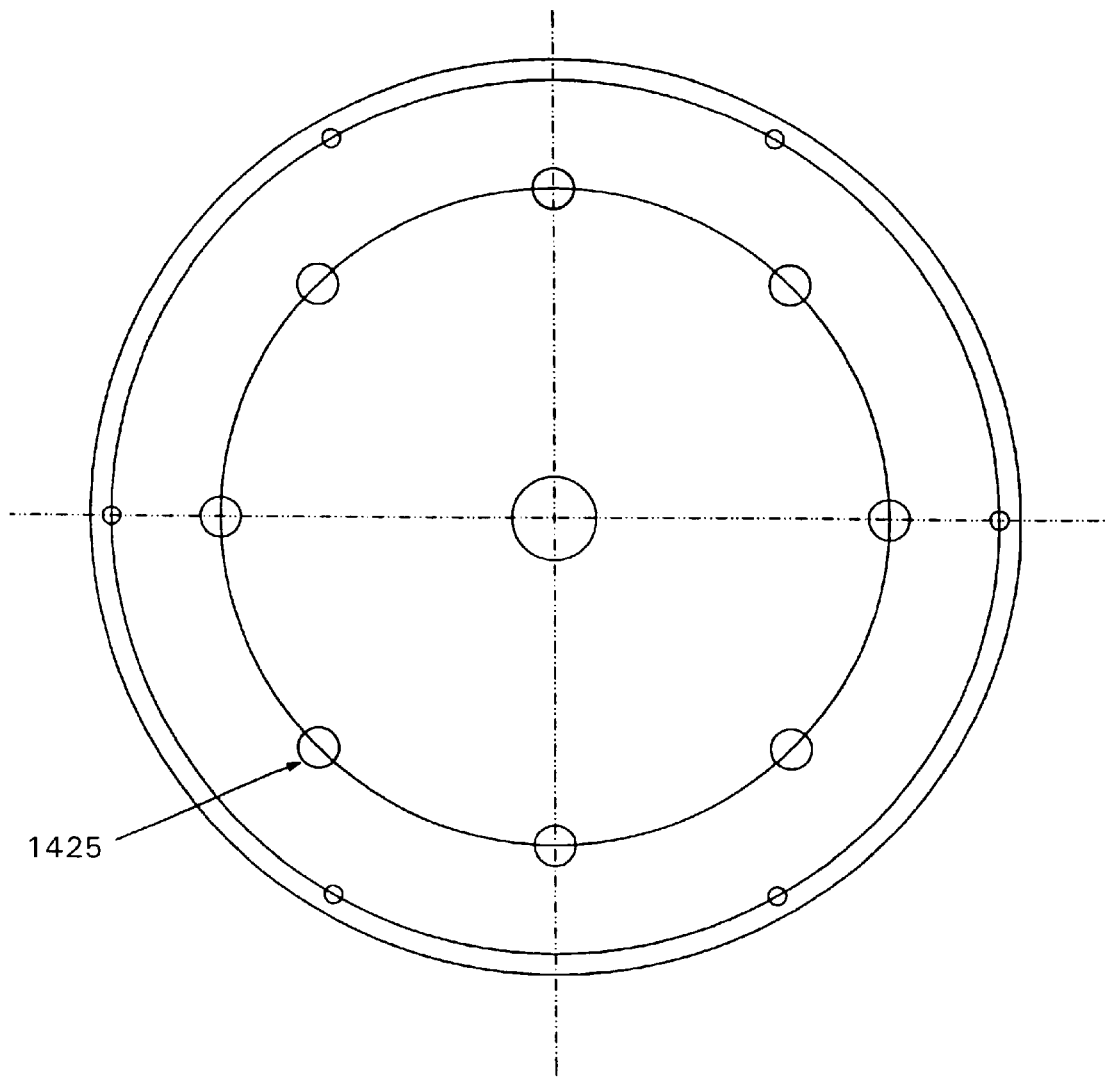
FIG. 9 is a top plan of the second stationary head of the second preferred embodiment of the rotatable valve of the present invention.
Figure 10:
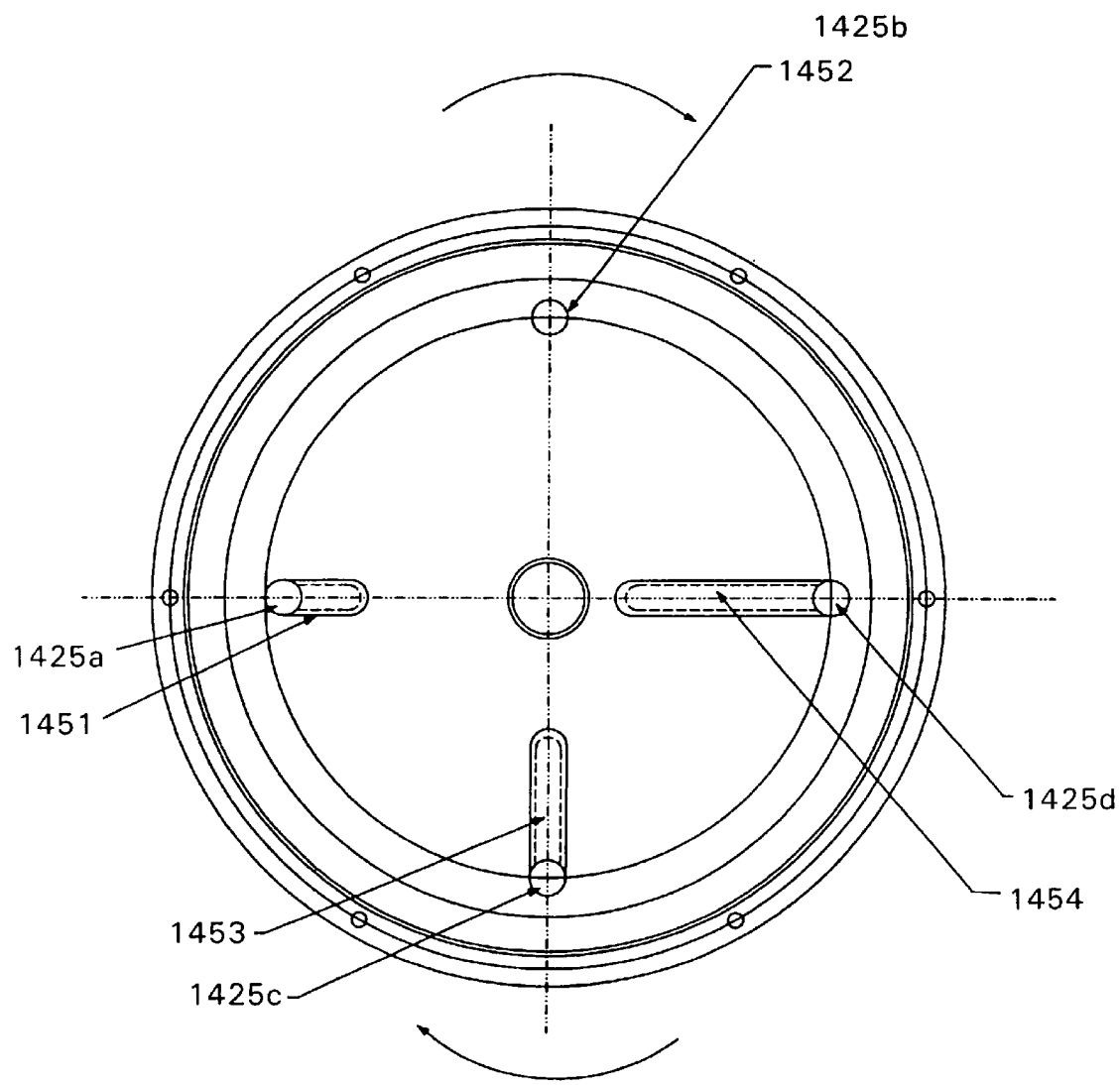
FIG. 10 is a top plan of the rotatable head of the second preferred embodiment of the rotatable valve of the present invention.

A plurality of primary connections such as 1421, 1422, 1423, and 1424 is provided through the stationary surface 1404 of the first stationary head assembly opposite to the rotating head assembly, through which connections fluid is conducted to or from outside the fluid-solid contacting apparatus. Thus, the number primary connections is equal to the sum of the numbers of input fluid streams conducted to and of output fluid streams away from the fluid-solid contacting apparatus and may be greater than four. Each of these primary connections communicates with a cylindrical primary bore that runs through the thickness of the first stationary head and terminates in one of the concentric circular channels. An array of secondary connections 1425 is uniformly spaced-apart and arranged on a circle concentric with the circular channels and through the stationary surface 1452 of the second stationary head assembly opposite to the rotating head assembly. The entrance end of each unit packed bed communicates with one such secondary connection via a separate fluid conduit. Thus, the number of secondary connections is equal to the number of unit packed beds. Each secondary connection 1425 communicates with a cylindrical secondary bore 1435 that runs through the thickness of the second stationary head and terminates in an opening on flat surface 1451. FIG. 8 shows the top view of the stationary head assembly with the hidden locations of the primary connections 1421, 1422, 1423, and 1424 and the concentric channels 1411, 1412, 1413, and 1414; each of which concentric channels is in communication with a primary connection 1421, 1422, 1423, or 1424. FIG. 9 is the top view of the second stationary head assembly 1450 showing the array of secondary connections 1425. The number of secondary connections is equal to the number of unit packed beds in the fluid-solid contacting apparatus. The number of secondary connections shown in FIG. 9 serves only to illustrate and to facilitate an understanding of, but in no way limits the present invention. Primary connection 1421 serves, for example, to transport the raffinate stream away from the moving-bed fluid-solid contacting apparatus. Primary connection 1422 serves, for example, as the point of introduction of the eluent fluid into the fluid-solid contacting apparatus. Primary connection 1423 serves, for example, as the point of introduction of the feedstock fluid into the fluid-solid contacting apparatus. Primary connection 1424 serves, for example, to transport the extract away from the fluid-solid contacting apparatus. FIG. 10 shows the bottom view of the rotating head assembly. A plurality of caverns is formed into the rotating head assembly. The number of such caverns is equal to the number of primary connections or the number of concentric channels. In FIG. 10, four such caverns are shown representatively and are hidden from the bottom view except for an opening from each cavern that serves as the communication with each concentric channel in the first stationary head assembly. It is understood that more than four caverns may be provided when the total number of fluid streams conducted to and away from the fluid-solid contacting apparatus is greater than four. Each cavern provides a means to communicate between one of the concentric channels in the stationary head assembly and a distinct secondary connection on the second stationary head assembly so that fluid present in a concentric channel is available to a different unit packed bed through the secondary connection, and vice versa. Cavern 1451 connects circular channel 1412 to a first secondary connection 1425a. Through this cavern, circular channel 1412, and secondary connection 1425a; the raffinate stream from the unit packed bed connected with the secondary connection 1425a is taken away from the fluid-solid contacting apparatus through primary connection 1421. Cavern 1452 connects circular channel 1411 to a second secondary connection 1425b. Through this cavern, circular channel 1411, and primary connection 1422; the eluent fluid is introduced into a second unit packed bed. In FIG. 10, cavern 1452 is illustrated merely as a straight bore traversing the thickness of the rotating head assembly. Cavern 1453 connects circular channel 1413 to a third secondary connection 1425c. Through this cavern, circular channel 1413, and primary connection 1423; the feedstock fluid stream is introduced into the fluid-solid contacting apparatus. Cavern 1454 connects circular channel 1414 to a fourth secondary connection 1425d. Through this cavern, circular channel 1414, and primary connection 1424; the extract stream is conducted away from the fluid-solid contacting apparatus. The relative positions of the secondary connections 1425a, 1425b, 1425c, and 1425d depend on the particular separation for which the moving-bed fluid-solid contacting apparatus is used. For example, factors that influence the number of unit packed beds in series between the locations of any two of the secondary connections 1425a, 1425b, 1425c, and 1425d include, but are not limited to, the type of solid packing, the affinity of the solid towards each component of the fluid mixture, the flow rate of the fluid mixture through the beds, the temperature of the fluid mixture, and the type of eluent. The rotating head assembly 1500 may be driven by any suitable driving means such as those enumerated above or their equivalents.

While the foregoing has described the preferred embodiments, and modes of operation of the present invention, it should be appreciated that numerous variations, changes, and equivalents may be made to these embodiments, and modes of operations without departing from the scope of the present invention as defined by the following claims.

What is claimed:

1. A multiport rotary valve for directing fluid streams comprising:
   (a) a first head having at least one primary port for connection with a fluid stream and at least one secondary port for connection with a fluid-solid contacting chamber; at least one first circular channel formed in said stationary head associated with a primary port and at least one concentric second channel formed in said stationary head;
   (b) a second rotatable head having at least one radial conduit, said radial conduit having first and second spaced apart ports for connection between a first or second circular channel and a secondary port, said rotatable head forming a fluid seal with said stationary head; and
   (c) drive for rotating said rotatable head to interconnect selected primary ports with selected secondary ports by use of said radial conduits.

2. The valve of claim 1 wherein a force-applying means is applied to either head to enable said fluid seal.

3. The valve of claim 1 further comprising channels located at the contacting surfaces of said heads and configured to connect more than one chamber together.

4. The valve of claim 1 wherein said rotatable head exhibits an indexing movement to allow interconnection of said external fluid streams with different chambers.

5. The valve of claim 1 wherein a position sensor is used to control the position of the rotatable head relative to the first head.

6. A multiport rotary valve for directing fluid streams comprising:
   (a) a first head having opposed surfaces, comprising at least two first ports located on the same surface for connection with an external fluid stream, and having a separate channel associated with each first port leading to a second port corresponding to the first port and located on the surface opposite the first port;
   (b) a rotatable second head having at least two third ports each in communication with a separate second port and channel and located on a surface in contact with the surface of the first head containing the second ports, said third ports leading to an inlet or outlet of a chamber containing a fluid-solid contacting medium so as to form a fluid seal between the chamber and an external fluid stream; and
   (c) a drive for rotating at least one of said heads to interconnect a selected external fluid stream with a selected chamber for a predetermined period of time before permitting interconnection of said external fluid stream with a different chamber;
   (d) the ports being configurable to permit said external fluid streams to be delivered to multiple or successive chambers in series or in parallel or to bypass a selected chamber simultaneous with the delivery of other external fluid streams; wherein a position sensor is used to control the position of the rotatable head relative to the first head.

7. The valve of claim 6 wherein a force-applying means is applied to either head to enable said fluid seal.

8. The valve of claim 6 further comprising channels located at the contacting surfaces of said heads and configured to connect more than one chamber together.

9. The valve of claim 6 wherein said rotatable head exhibits an indexing movement to allow interconnection of said external fluid streams with different chambers.

* * * * *